US010762620B2

(12) United States Patent
Gallo et al.

(10) Patent No.: US 10,762,620 B2
(45) Date of Patent: Sep. 1, 2020

(54) DEEP-LEARNING METHOD FOR SEPARATING REFLECTION AND TRANSMISSION IMAGES VISIBLE AT A SEMI-REFLECTIVE SURFACE IN A COMPUTER IMAGE OF A REAL-WORLD SCENE

(71) Applicant: NVIDIA Corporation, Santa Clara, CA (US)

(72) Inventors: Orazio Gallo, Santa Cruz, CA (US); Jinwei Gu, San Jose, CA (US); Jan Kautz, Lexington, MA (US); Patrick Wieschollek, Kusterdingen (DE)

(73) Assignee: NVIDIA Corporation, Santa Clara, CA (US)

( * ) Notice: Subject to any disclaimer, the term of this patent is extended or adjusted under 35 U.S.C. 154(b) by 130 days.

(21) Appl. No.: 16/200,192

(22) Filed: Nov. 26, 2018

(65) Prior Publication Data

US 2019/0164268 A1    May 30, 2019

Related U.S. Application Data

(60) Provisional application No. 62/591,087, filed on Nov. 27, 2017.

(51) Int. Cl.
*G06T 7/00* (2017.01)
*G06K 9/62* (2006.01)
(Continued)

(52) U.S. Cl.
CPC .............. *G06T 7/001* (2013.01); *G06K 9/621* (2013.01); *G06N 20/00* (2019.01); *G06T 1/20* (2013.01);
(Continued)

(58) Field of Classification Search
CPC ........... G06T 7/001; G06T 1/20; G06T 5/001; G06T 11/40; G06T 15/00;
(Continued)

(56) References Cited

U.S. PATENT DOCUMENTS 9,904,995 B2    2/2018  Karlinsky et al.
10,049,308 B1    8/2018  Dhua et al.
(Continued)

FOREIGN PATENT DOCUMENTS

CN    106127696 A    11/2016
CN    106204467 A    12/2016
(Continued)

OTHER PUBLICATIONS

Schechner et al., "Polarization and statistical analysis of scenes containing a semireflector," J. Optical Soc. America, 2000, 276-284.
Kong et al., "A physically-based approach to reflection separation: from physical modeling to constrained optimization," IEEE Trans. Pattern Analysis and Machine Intel., 2013, 14 pages.
(Continued)

*Primary Examiner* — Ping Y Hsieh
(74) *Attorney, Agent, or Firm* — Leydig, Voit & Mayer, Ltd.

(57) ABSTRACT

When a computer image is generated from a real-world scene having a semi-reflective surface (e.g. window), the computer image will create, at the semi-reflective surface from the viewpoint of the camera, both a reflection of a scene in front of the semi-reflective surface and a transmission of a scene located behind the semi-reflective surface. Similar to a person viewing the real-world scene from different locations, angles, etc., the reflection and transmission may change, and also move relative to each other, as the viewpoint of the camera changes. Unfortunately, the dynamic nature of the reflection and transmission negatively impacts the performance of many computer applications, but performance can generally be improved if the reflection and transmission are separated. The present disclosure uses deep
(Continued)

learning to separate reflection and transmission at a semi-reflective surface of a computer image generated from a real-world scene.

19 Claims, 11 Drawing Sheets

(51) Int. Cl.
```
G06T 1/20      (2006.01)
G06N 20/00     (2019.01)
G06T 11/40     (2006.01)
G06T 15/00     (2011.01)
G06T 5/00      (2006.01)
```
(52) U.S. Cl.
CPC .............. *G06T 5/001* (2013.01); *G06T 11/40* (2013.01); *G06T 15/00* (2013.01); *G06T 2207/20081* (2013.01); *G06T 2207/20084* (2013.01)

(58) Field of Classification Search
CPC G06T 2207/20081; G06T 2207/20084; G06N 20/00; G06K 9/621
See application file for complete search history.

(56) References Cited

U.S. PATENT DOCUMENTS

| | | | | |
|---|---|---|---|---|
| 2009/0167763 | A1* | 7/2009 | Waechter | G06T 15/06 345/426 |
| 2013/0335434 | A1* | 12/2013 | Wang | G06N 20/00 345/581 |
| 2016/0210778 | A1* | 7/2016 | Zimmer | G06T 5/002 |
| 2018/0047208 | A1* | 2/2018 | Marin | H04N 13/243 |
| 2018/0114096 | A1 | 4/2018 | Sen et al. | |
| 2018/0189568 | A1* | 7/2018 | Powderly | G06K 9/00604 |
| 2018/0253839 | A1* | 9/2018 | Zur | A61B 1/31 |
| 2019/0180409 | A1* | 6/2019 | Moloney | G06T 15/08 |

FOREIGN PATENT DOCUMENTS

| | | |
|---|---|---|
| CN | 107256541 A | 10/2017 |
| CN | 107871332 A | 4/2018 |
| CN | 108229525 A | 6/2018 |
| CN | 108460408 A | 8/2018 |
| WO | 2017154630 A1 | 9/2017 |
| WO | 2018018470 A1 | 2/2018 |
| WO | 2018048507 A1 | 3/2018 |

OTHER PUBLICATIONS

Levin et al., "User assisted separation of reflections from a single image using a sparsity prior," IEEE Trans. on Patt. Anal. and Machine Intel., 2007, 19 pages.
Arvanitopoulos et al., "Single image reflection suppression," Proc. IEEE Conf. Comp. Vision and Patt. Recog., 2017, pp. 4498-4506.
Diamant et al., "Overcoming Visual Reverberations," Proc. IEEE Comp. Vision and Patt. Recog., 2008, 8 pages.
Kaftory et al., "Blind separation of time/position varying mixtures," IEEE Trans. Image Processing, 2013, pp. 104-118.
Farid et al., "Separating reflections and lighting using independent components analysis," Proc. IEEE Comp. Soc. on Comp. Vision and Patt. Recog., 1999, pp. 262-267.
Barros et al., "Separating virtual and real objects using independent component analysis," IEICWE Trans Inf and Sys, 2001, pp. 29-34.
Fan et al., "A generic deep architecture for single image reflection removal and image smoothing," Proc. IEEE Int Conf on Comp Vision, 2017, 30 pages.
Li et al., "Single image layer separation using relative smoothness," Proc IEEE Conf on Comp Vision and Patt Recog, 2014, 8 pages.
Shin et al., "Reflection romoval using ghosting cues," Proc IEEE Conf Comp Vision and Patt Recog, 2015, 1 page.
Li et al., "Exploiting reflection change for automatic reflection removal," Proc IEEE Int Conf on Comp Vision, 2013, 8 pages.
Xue et al., "A computational approach for obstruction-free photography," ACM Trans on Graphics, 2015, 11 pages.
Szeliski et al., "Layer extraction from multiple images containing reflections and transparency," Proc IEEE Conf on Comp Vision and Patt Recog, 2000, 8 pages.
Guo et al, "Robust separation of reflection from multiple images," Proc IEEE Conf on Comp Vision and Patt Recog, 2014, 8 pages.
Han et al, "Reflection removal using low-rank matrix completion," Proc IEEE Conf on Comp Vision and Patt Recog, 2017, 9 pages.
Brownlee, "How to Prepare Data for Machine Learning," Machine Learning Process, 2013, 4 pages. Retrieved from https://machinelearningmastery.com/how-to-prepare-data-for-machine-learning/.
Shin et al., "Reflection Removal using Ghosting Cues," 2015, 9 pages. Retrieved from http://people.csail.mit.edu/yichangshih/mywebsite/reflection.pdf.
Bronstein et al., "Sparse ICA for Blind Separation of Transmitted and Reflected Images," International Journal of Imaging Systems and Technology vol. 15, 2005, pp. 84-91. Retrieved from http://webee.technion.ac.il/people/zeevi/papers/38.pdf.pdf.
Hu, Matthew, "Reflection Removal Algorithms," 2016, 6 pages. Retrieved from http://stanford.edu/class/ee367/Winter2016/Hu_Report.pdf.

* cited by examiner

DEEP-LEARNING METHOD FOR SEPARATING REFLECTION AND TRANSMISSION IMAGES VISIBLE AT A SEMI-REFLECTIVE SURFACE IN A COMPUTER IMAGE OF A REAL-WORLD SCENE

CLAIM OF PRIORITY

This application claims the benefit of U.S. Provisional Application No. 62/591,087 titled "A DEEP-LEARNING METHOD TO SEPARATING REFLECTION AND TRANSMISSION IMAGES IN THE WILD," filed Nov. 27, 2017, the entire contents of which is incorporated herein by reference.

FIELD OF THE INVENTION

The present invention relates to generating images from real-world scenes, and more particularly to generating images from real-world scenes having semi-reflective surfaces.

BACKGROUND

When a computer image, which may be a two-dimensional (2D) or three-dimensional (3D) image, is generated from a real-world scene, the computer image may include a semi-reflective surface (e.g. window) that creates both a reflection layer (e.g. reflection radiance map) and a transmission layer (e.g. transmission radiance map). The reflection layer may include a reflection of a scene in front of the semi-reflective surface from the perspective of a camera capturing the real-world scene, where the reflected scene may or may not be behind the camera. On the other hand, the transmission layer may include transmission of a scene located behind the semi-reflective surface from the perspective of the camera, where the transmission scene is visible through the semi-reflective surface. Similar to a person viewing the real-world scene from different locations, angles, etc., the reflection and transmission layers may change, and also move relative to each other, as the viewpoint of the camera changes.

Unfortunately, the performance of many computer applications that process scenes having semi-reflective surfaces is negatively impacted as a result of the reflections caused by the semi-reflective surfaces. For example, some applications including computer vision applications, such as multi-view stereo (MVS), image registration, or simultaneous localization and mapping (SLAM), depend on the ability to find corresponding image patches across images taken from different views of a particular scene. However, this ability traditionally relies on the assumption that a pixel captures radiance from a single object, such that pixels with a same radiance across the images (even after accounting for geometric distortion) are correlated. However, semi-reflective surfaces break this assumption by creating a superposition of two images (the images of the reflected and transmitted radiance) at the same pixel, which may cause a variance in the radiance of the pixels that would otherwise be assumed to correlate across the images. To hold the assumption true, there is a need to separate reflection and transmission images included on a semi-reflective surface of a computer generated image, so that the image processing applications can process the reflection and/or transmission images independently.

Some prior methods have attempted to provide this separation of reflection and transmission images by capturing multiple polarization images (i.e. images captured at different polarization angles). Since these images offer independent measurements of the same scene, the reflection and transmission have simply been separated using independent component analysis of the captured images. However, these prior methods make strong assumptions about the different images, such as that the viewing angle is roughly the Brewster angle where polarization helps the most, that the reflection will be blurry, that the semi-reflective surface will be flat, etc. Since these assumptions do not necessarily hold true in the real-world, the quality of the results of these simplified methods degrades significantly when applied to real-world images versus synthetic images.

There is a need for addressing these issues and/or other issues associated with the prior art.

SUMMARY

A method, computer readable medium, and system are disclosed which use deep learning to separate reflection and transmission images visible at a semi-reflective surface in a computer image of a real-world scene. In use, training data for a deep learning network is synthesized. In particular, the training data is synthesized by applying a plurality of manipulations to a training reflection image and a training transmission image for a semi-reflective surface representation, the plurality of manipulations simulating behaviors observed in real-world data. Additionally, the deep learning network is trained to learn a residual representation of a reflection and transmission relative to input images, using the training data. Further, polarization images of a real-world scene having a semi-reflective surface are received as input to the deep learning network, and the deep learning network outputs the residual representation of the reflection and transmission for the semi-reflective surface of the real-world scene.

DETAILED DESCRIPTION

When a computer image is generated from a real-world scene having a semi-reflective surface (e.g. window), the computer image will create, at the semi-reflective surface from the viewpoint of the camera, both a reflection of a scene in front of the semi-reflective surface and a transmission of a scene located behind the semi-reflective surface. Similar to a person viewing the real-world scene from different locations, angles, etc., the reflection and transmission may change, and also move relative to each other, as the viewpoint of the camera changes. Unfortunately, the dynamic nature of the reflection and transmission negatively impacts the performance of many computer applications, but performance can generally be improved if the reflection and transmission are separated.

A method, computer readable medium, and system are provided which use deep learning to separate reflection and transmission at a semi-reflective surface of a computer image generated from a real-world scene. In particular, a deep learning network is trained, using synthesized training data that has been manipulated to simulate behaviors observed in real-world data, to learn a residual representation of a reflection and transmission relative to input images. When polarization images of a real-world scene having a semi-reflective surface are then input to the deep learning network, the deep learning network outputs the residual representation of the reflection and transmission for the semi-reflective surface of the real-world scene.

Figure 1:
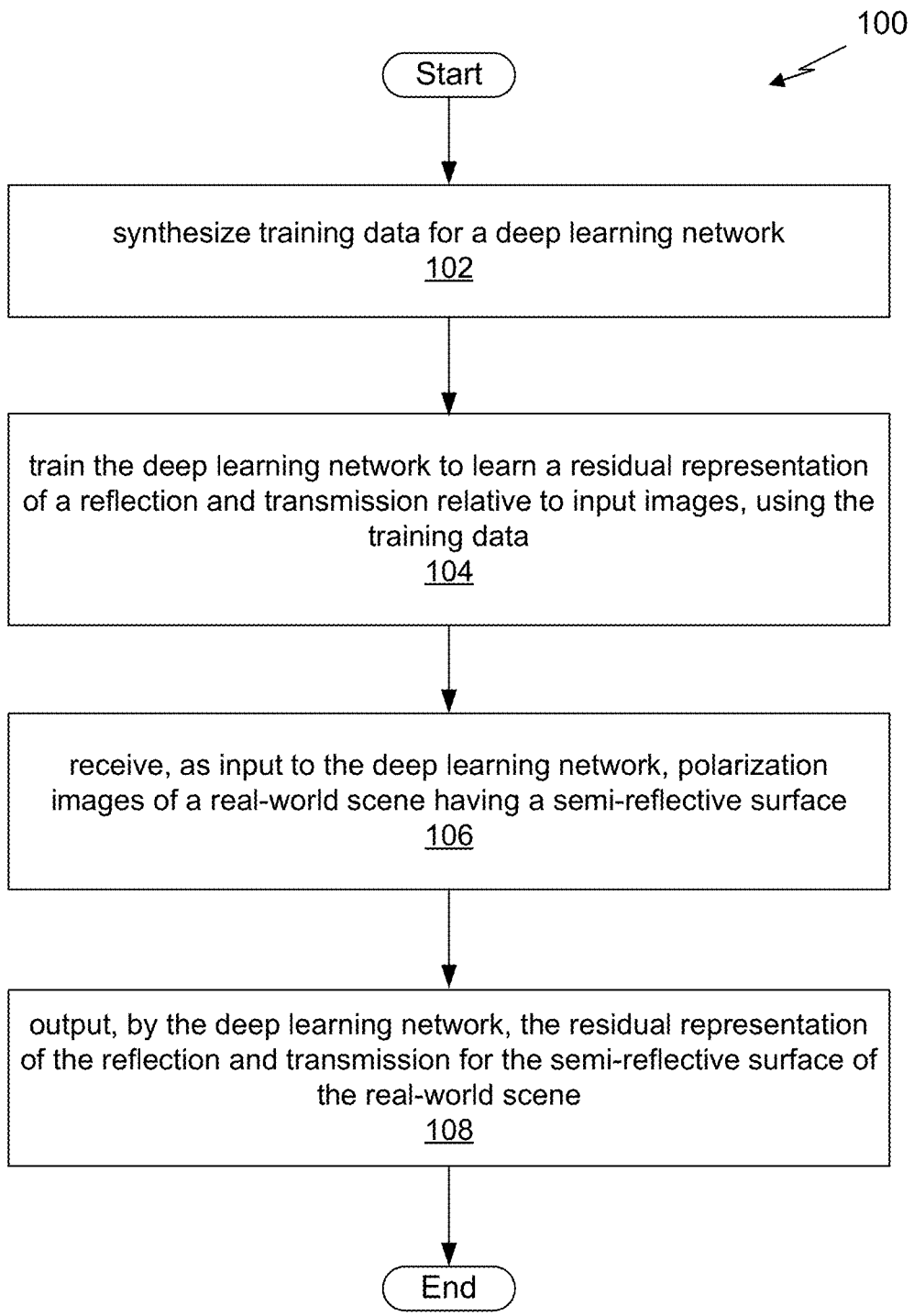
FIG. 1 illustrates a flowchart of a deep learning method that separates reflection and transmission images visible at a semi-reflective surface in a computer image of a real-world scene, in accordance with an embodiment.

FIG. 1 illustrates a flowchart of a deep learning method 100 that separates reflection and transmission images visible at a semi-reflective surface in a computer image of a real-world scene, in accordance with an embodiment. In one embodiment, the method 100 may be performed using a processing unit, a program, custom circuitry, or by a combination thereof. For example, the method 100 may be executed by a GPU (graphics processing unit), CPU (central processing unit), and/or in the context of the any of the hardware embodiments described below. Furthermore, persons of ordinary skill in the art will understand that any system that performs method 100 is within the scope and spirit of embodiments of the present invention.

In operation 102, training data for a deep learning network is synthesized. In particular, the training data is synthesized by applying a plurality of manipulations to a training reflection image and a training transmission image for a semi-reflective surface representation, where the plurality of manipulations simulate behaviors observed in real-world data.

In one embodiment, a training image set may be stored in a database and may include a plurality of different data points each having a particular training reflection image and a particular training transmission image corresponding to a particular semi-reflective surface representation. With respect to this embodiment, the training data may be synthesized using a selected one of the data points from the training image set. As an option, the data point may be randomly selected from the training image set. Of course, it should be noted that the data point, or more generally the training reflection image and the training transmission image, may be synthetic, and pre-generated and/or selected in any context for use in training the deep learning network.

Moreover, the training reflection image may be a reflection image at the semi-reflective surface representation (i.e. a representation of a reflection of a scene in front of the semi-reflective surface representation), whereas the training transmission image may be a transmission image at the semi-reflective surface representation (i.e. a representation of a transmission of a scene located behind the semi-reflective surface representation).

As noted above, the training data is synthesized by applying a plurality of manipulations to the training reflection image and a training transmission image. In particular, the manipulations simulate at least some behaviors observed in real-world data, such that the resulting training data, while synthetic, mimics at least in part a real-world view of the semi-reflective surface representation. As an option, the manipulations may be applied to the training reflection image and training transmission image through a data generation pipeline that takes the training reflection image and training transmission image as input and that outputs the training data for the deep learning network.

In one embodiment, the manipulations include manipulating the dynamic range (DR) of the training reflection image and the training transmission image. For example, since real-world scenes are generally high-DR (HDR), where the training image set is lower-DR (LDR) the DR of the training reflection image and the training transmission image may be manipulated so as to match the appearance of reflections observed in real-world scenes, respectively using predefined mathematical algorithms. This may include brightening either the training reflection image or the training transmission image. As another example, the DR of the training reflection image may further be manipulated to provide edge-aware reflection, since in real-world scenes it is observed that the reflection drops abruptly following the boundaries of an object. This edge-aware reflection may be provided in particular by setting to zero regions of the training reflection image having an intensity below some defined threshold.

In another embodiment, the training reflection image and the training transmission image may be manipulated to simulate artifacts caused by movement in a real-world scene. For example, in a real-world scenario, a reflection image and transmission image for a scene would be estimated from a plurality of images of the scene captured in sequence at different polarization angles. If there is movement in the scene during the image captures, the images will have some variance caused by the movement. Accordingly, the training reflection image and the training transmission image may be manipulated to simulate these artifacts. The artifacts may be simulated by defining a grid over a patch of the training reflection image, perturbing the grid's anchors by some selected x,y amount, and interpolating a position of the remaining pixels in the patch. For the patch, polarization images are created, which are separate images created for each of the polarization angles.

In yet another embodiment, the training reflection image and the training transmission image may be manipulated to simulate local curvatures of the semi-reflective surface representation. For example, in a real-world scene, the semi-reflective surface will have at least local curvatures caused by imperfections in the manufacturing process used to create the semi-reflective surface. Thus, the training reflection image and the training transmission image may be manipulated to simulate these local curvatures. The local curvatures may be simulated using a parabola by sampling four parameters: the camera position, a point on the surface, a segment length, and the convexity as +/−1. This allows a very large number of local curvatures to be provided that are smooth and easy to convert to angle of incidence, i.e., viewing angle from the perspective of the camera.

A latent reflection image and a latent transmission image may result from the manipulations applied to the respective training reflection image and training transmission image, as well as the polarization images created when simulating the artifacts caused by movement. Accordingly, the training data synthesized for the deep learning network may include the latent reflection image, the latent transmission image, and the above described polarization images (hereinafter referred to as training polarization images).

Additionally, in operation 104, the deep learning network is trained to learn a residual representation of a reflection and transmission relative to input images, using the training data. As described below, the input images are polarization images. Accordingly, the deep learning network is trained to learn how to determine the residual representation of a reflection and transmission from the training polarization images.

Further, in operation 106, polarization images of a real-world scene having a semi-reflective surface are received as input to the deep learning network. The polarization images include a plurality of images of the scene captured at different polarization angles. The polarization angles may be preconfigured, in one embodiment.

Using the polarization images, the deep learning network generates an estimated reflection image and an estimated transmission image for the scene. This may be accomplished using a predefined algorithm, for example which roughly estimates the reflection image and the transmission image for the scene. The deep learning network then learns the residual representation of the reflection and transmission for the semi-reflective surface of the real-world scene, using the estimated reflection image and the estimated transmission image.

Still yet, in operation 108, the deep learning network outputs the residual representation of the reflection and transmission for the semi-reflective surface of the real-world scene. Optionally, the residual representation of the reflection and transmission may be used by image processing applications, such as computer vision applications including multi-view stereo (MVS), image registration, or simultaneous localization and mapping (SLAM).

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Polarization, Reflections, and Transmissions

Consider two points, $P_R$ and $P_T$ such that $P'_R$, the reflection of $P_R$, lies on the line of sight of $P_T$, and assume that both emit unpolarized light. After being reflected or transmitted, unpolarized light becomes polarized by an amount that depends on $\theta$, the angle of incidence (AOI).

At point $P_S$, the intersection of the line of sight and the surface, the total radiance L is a combination of the reflected radiance $L_R$, and the transmitted radiance $L_T$. Assume a linear polarizer with polarization angle $\phi$ is placed in front of the camera. After integrating over the exposure time, the intensity at each pixel x is:

$$I_\phi(x) = \alpha(\theta, \phi_\perp, \phi) \cdot \frac{I_R(x)}{2} + (1 - \alpha(\theta, \phi_\perp, \phi)) \cdot \frac{I_T(x)}{2} \quad \text{(Equation 1)}$$

where the mixing coefficient $\alpha(\cdot) \in [0, 1]$, the angle of incidence $\theta(x) \in [0, \pi/2]$, the p-polarization direction $[2]\phi_\perp(x) \in [-\pi/4, \pi/4]$, and the reflected and transmitted images at the semi-reflector, $I_R(x)$ and $I_T(x)$, are all unknown.

At the Brewster angle, $\phi_B$, the reflected light is completely polarized along $\phi_\perp$, i.e. in the direction perpendicular to the incidence plane (which is defined by the direction in which the light is traveling and the semi-reflector's normal), and the transmitted light along $\phi_\parallel$, the direction parallel to the plane of incidence. The angles $\phi_\perp$ and $\phi_{s1}$ are called the canonical polarization angles. In the unique condition in which $\theta(x) = \theta_B$, two images captured with the polarizer at the canonical polarization angles offer independent observations that are sufficient to disambiguate between $I_R$ and $I_T$. Unless the camera or the semi-reflector are at infinity, however, $\theta(x) = \theta_B$ only holds for few points in the scene, if any.

To complicate things, for curved surfaces, $\theta(x)$ varies non-linearly with x. Finally, even for arbitrarily many acquisitions at different polarization angles, $\phi_j$, the problem remains ill-posed as each observation $I_{\phi j}$ adds new pixel-wise unknowns $\alpha(\theta, \phi_\perp; \phi_j)$.

The synthetic data generation for the deep learning network, as well as the deep learning network itself, as described below, address these and other issues in order to separate reflection and transmission images for a real-world scene having a semi-reflective surface.

Figure 2A:
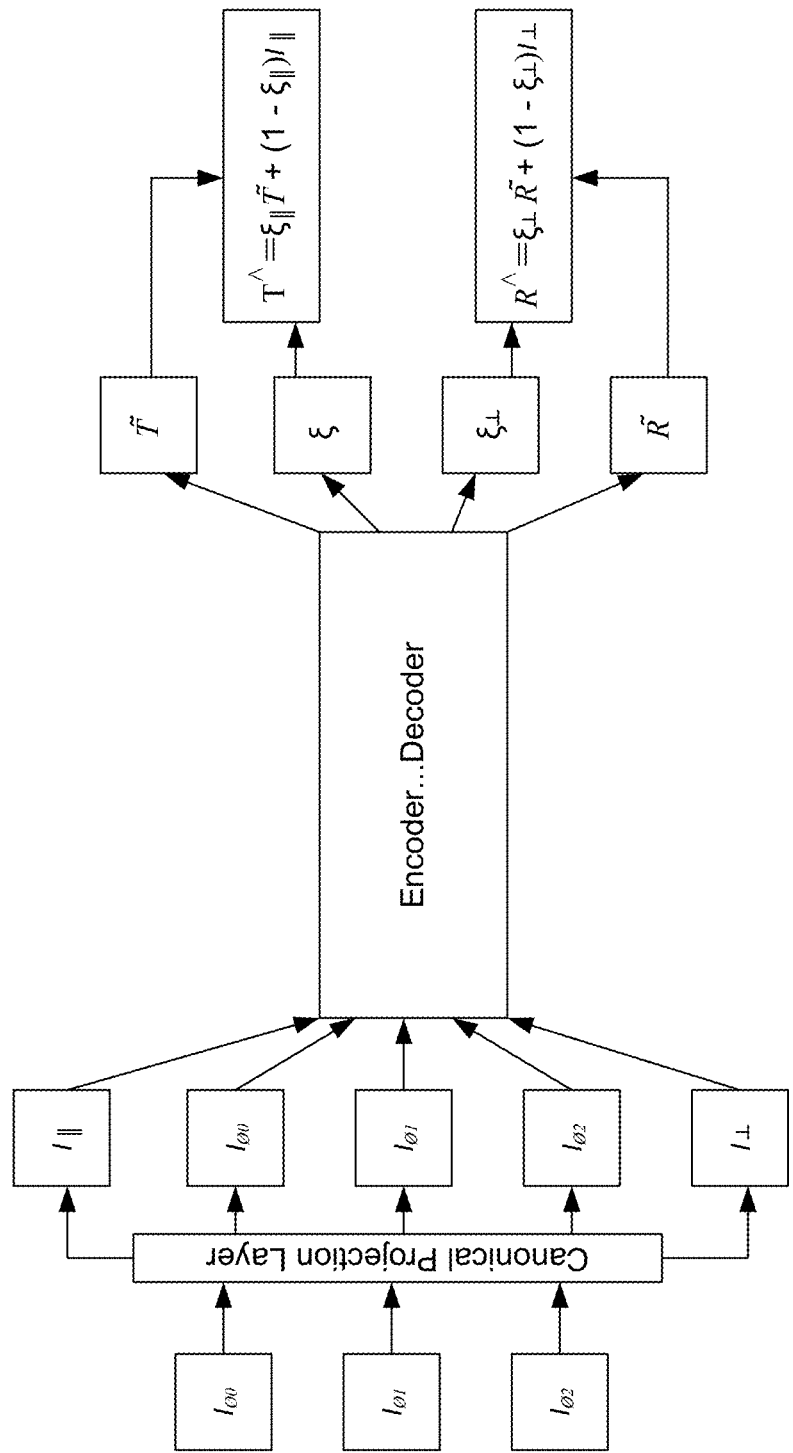
FIG. 2A illustrates a block diagram of the execution phase of the deep learning network, in accordance with an embodiment.

FIG. 2A illustrates a block diagram of the execution phase of the deep learning network, in accordance with an embodiment. In particular, FIG. 2A shows a deep learning network that projects input images onto the canonical polarization directions, and uses a residual parameterization for R^ and T^. The description of the deep learning network below provides various exemplary embodiments for the deep learning network described with respect to FIG. 1, and thus should not be construed as necessarily limiting the deep learning network described with respect to FIG. 1.

When viewed through a polarizer oriented along direction $\phi$, $I_R$ and $I_T$, which are the reflected and transmitted images at the semi-reflector, produce image $I_\phi$ at the sensor. Due to differences in dynamic range, as well as noise, in some regions the reflection may dominate $I_\phi$, or vice versa, as described in more detail below. Without hallucinating content, one can only aim at separating R and T, which is defined to be the observable reflected and transmitted components. For instance, T may be zero in regions where R dominates, even though $I_T$ may be greater than zero in those regions. To differentiate them from the ground truth, the estimates are referred to as R^ and T^.

To recover R^ and T^, =the encoder-decoder architecture shown is used, which is particularly effective for a number of tasks, such as image-to-image translation, denoising, or deblurring. Learning to estimate R^ and T^ directly from images taken at arbitrary polarization angles does not produce satisfactory results. One main reason is that parts of the image may be pure reflections, thus yielding no information about the transmission, and vice versa.

To address this issue, the polarization properties of reflected and transmitted images are relied upon. Recall that R and T are maximally attenuated, though generally not completely removed, at $\phi_\perp$ and $\phi_\parallel$ respectively. The canonical polarization angles depend on the geometry of the scene, and are thus hard to capture directly. However, an image $I\phi(x)$ can be expressed as:

$$L_\phi(x) = I_\perp(x)\cos^2(\phi - \phi_\perp(x)) + I_\parallel(x)\sin^2(\phi - \phi_\perp(x)) \quad \text{(Equation 2)}$$

Since there are three unknowns, $I_\perp$, $\phi_\perp$, and $I_\parallel$, three different observations of the same scene can be used, $\{I_{\phi i}(x)\}_{i=\{0,1,2\}}$, to obtain a linear system that allows to compute $I_\perp(x)$ and $I_\parallel(x)$. To further simplify the math, images are captured such that $\phi_i = \phi_0 + i \cdot \pi/4$.

For efficiency, the projection is made onto the canonical views as a network layer in TensorFlow. The canonical views and the actual observations are then stacked in a 15-channel tensor and used as input to our network. Then, instead of training the network to learn to predict $\hat{R}$ and $\hat{T}$, it is trained to learn the residual reflection and transmission layers. More specifically, the network is trained to learn an 8-channel output, which comprises the residual images $\tilde{T}(x)$, $\tilde{R}(x)$, and the two single-channel weights $\xi_\parallel(x)$ and $\xi_\perp(x)$. Dropping the dependency on pixel x for clarity, the following can be computed:

$$\hat{R} = \xi_\perp \tilde{R} + (1-\xi_\perp)I_\perp \text{ and } \hat{T} = \xi_\parallel \tilde{T} + (1-\xi_\parallel)I_\parallel \quad \text{(Equation 3)}$$

While $\xi_\perp$ and $\xi_\parallel$ introduce two additional unknowns per pixel, they significantly simplify the prediction task in regions where the canonical projections are already good predictors of $\hat{R}$ and $\hat{T}$. An encoder-decoder is used with skip connections that consists of three down-sampling stages, each with two ResNet blocks. The corresponding decoder mirrors the encoding layers using a transposed convolution with two ResNet blocks. An $l_2$ loss is used on $\hat{R}$ and $\hat{T}$.

Figure 2B:
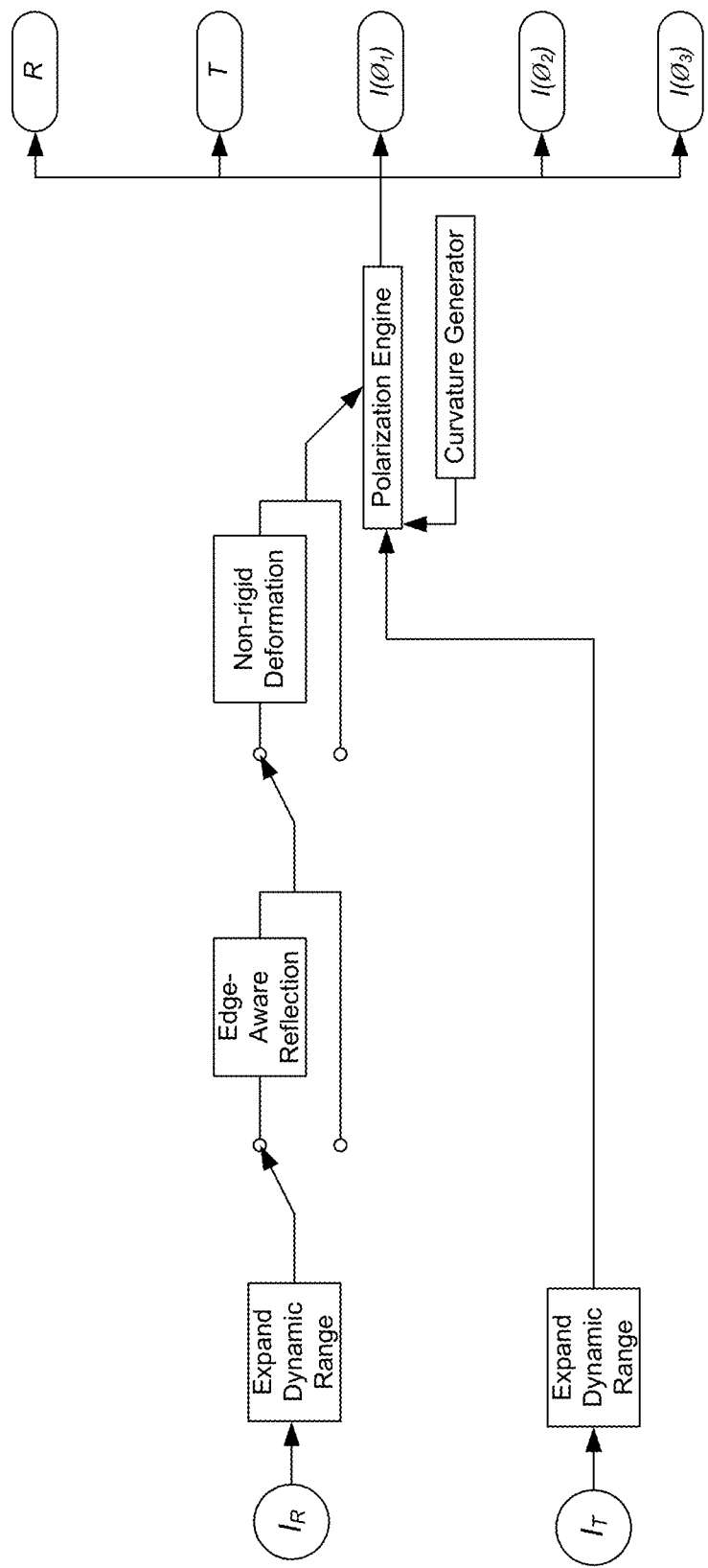
FIG. 2B illustrates a block diagram of the training phase for the deep learning network, in accordance with an embodiment.

FIG. 2B illustrates a block diagram of the training phase for the deep learning network, in accordance with an embodiment. In particular, FIG. 2B shows a synthetic data generation pipeline that generates training data for the deep learning network. The description of the synthetic data generation pipeline below provides various exemplary embodiments for the training data synthesis described with respect to FIG. 1, and thus should not be construed as necessarily limiting the training data synthesis described with respect to FIG. 1.

The ground truth data to estimate $\hat{R}$ and $\hat{T}$ is virtually impossible to capture in the wild. In principle, Equation 1 could be used directly to generate, from any two images, the data we need. The term $\alpha$ in the equation, however, hides several subtleties and nonidealities. For instance, previous polarization-based works use it to synthesize data by assuming uniform AOI, perfectly flat surfaces, comparable power for the reflected and transmitted irradiance, or others. This generally translates to poor results on images captured in the wild.

The synthetic data generation pipeline shown in FIG. 2B provides greater accuracy for generating the training data for the deep learning network. This pipeline starts from two randomly picked images from a dataset, $I_R$ and $I_T$, which we treat as the image of reflected and transmitted scene at the surface. From those, the behaviors observed in real-world data are modeled, which is described below by "following" the path of the photons from the scene to the camera.

To simulate realistic reflections, the dynamic range (DR) of the transmitted and reflected images at the surface must be significantly different. This is because real-world scenes are generally high-dynamic-range (HDR). Additionally, the light intensity at the surface drops with the distance from the emitting object, further expanding the combined DR. However, the inputs are low-dynamic-range images because a large dataset of HDR images is not available. The DR of the inputs is artificially manipulated so as to match the appearance of the reflections observed in real-world scenes.

For regions where $L_T \approx L_R$, a picture taken without a polarizer will capture a smoothly varying superposition of the images of $P_R$ and $P_T$. For areas of the surface where $L_R \gg L_T$, however, the total radiance is $L \approx L_R$, and the semi-reflector essentially acts as a mirror. The opposite situation is also common. To allow for these distinct behaviors, the dynamic range of the input images is manipulated with a random factor $\beta \sim U[1, K]$:

$$\tilde{I}_R = \beta I_R^{1/\gamma} \text{ and } \tilde{I}_T = \frac{1}{\beta} I_T^{1/\gamma} \quad \text{(Equation 4)}$$

where $1/\gamma$ linearizes the gamma-compressed inputs. K>1 is used to compensate for the fact that a typical glass surface transmits a much larger portion of the incident light than it reflects.

Images $\tilde{I}_R$ and $\tilde{I}_T$ can reproduce the types of reflections described above, but are limited to those cases for which $L_R - L_T$ changes smoothly with $P_S$. However, the reflection can drop abruptly following the boundaries of an object. This may happen when an object is much closer than the rest of the scene, or when its radiance is larger than the surrounding objects. To properly model this behavior, it is treated as a type of reflection on its own, which is applied to a random subset of the image whose range we have already expanded. Specifically, the regions of the reflection or transmission layer whose intensity is below T=mean $(\tilde{I}_R + \tilde{I}_T)$ are set to zero.

The approach described herein requires images captured under three different polarization angles. While cameras that can simultaneously capture multiple polarization images exist, they are not widespread. To date, the standard way to capture different polarization images is sequential; this causes complications for non-static scenes. If multiple pictures are captured from different locations, the relative motion between the transmitted and reflected layers can help disambiguate them. Here, however, "non-static" refers to the scene itself, such as is the case when a tree branch moves between the shots. Rather than requiring some pre-processing to fix artifacts due to small scene changes at inference time, however, training data is synthesized to simulate them, such as local, non-rigid deformations. A regular grid if first defined over a patch, and then each one of the grid's anchors are perturbed by (dx, dy), both sampled from a Gaussian with variance $\sigma^2_{NR}$, which is also drawn randomly for each patch. The position of the rest of the pixels in the patch are then interpolated. For each input patch, three different images are generated, one per polarization angle. This processing may only be applied to a subset of the synthesized images since the scene is not always dynamic.

The images synthesized up to this point can be thought of as the irradiance of the unpolarized light at the semi-reflector. After bouncing off of, or going through, the surface, light becomes polarized. The effect of a linear polarizer placed in front of the camera and oriented at a given polarization angle, depends on the angle of incidence (AOI) of the specific light ray. Some previous works assume this angle to be uniform over the image, which is only true if the camera is at infinity, or if the surface is flat.

Figure 2C:
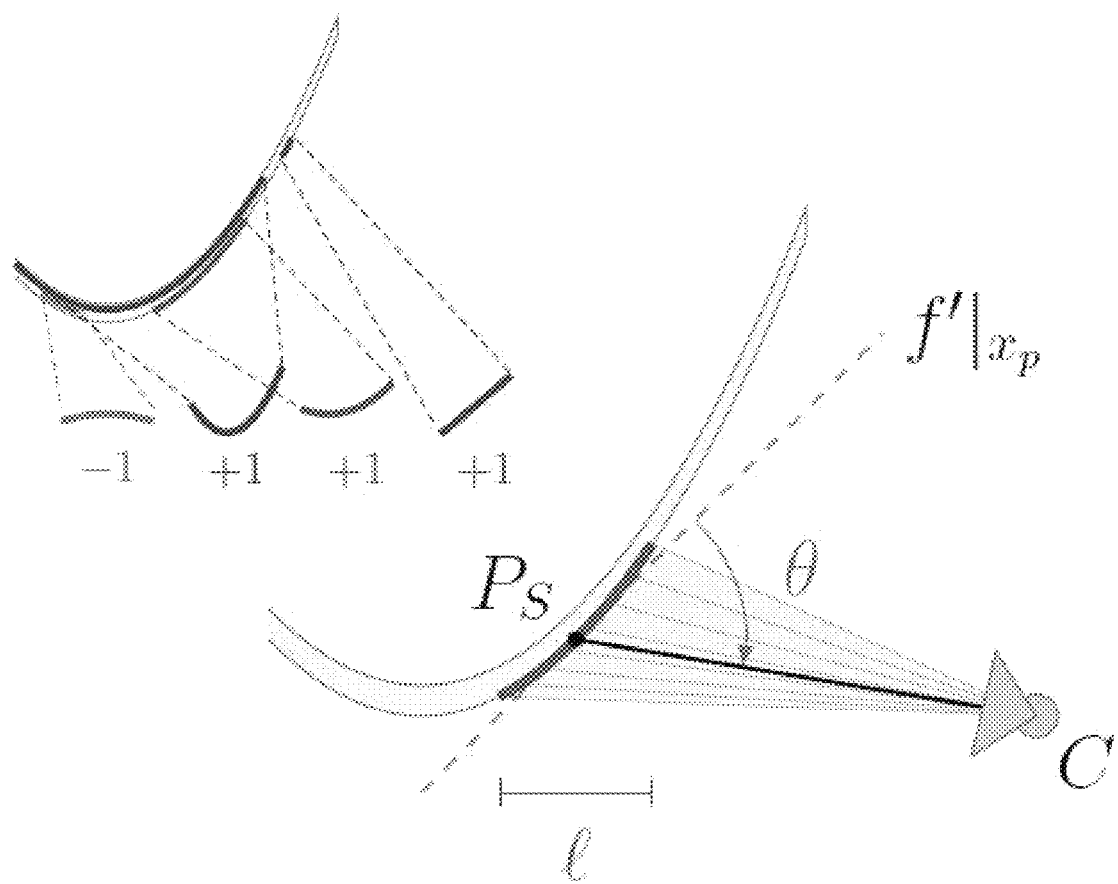
FIG. 2C illustrates a curved surface generator used by the training phase for the deep learning network, in accordance with an embodiment.

Real-world surfaces are hardly ever perfectly flat. Many common glass surfaces are in fact designed to be curved, as is the case of car windows. Even when the surfaces are meant to be flat, the imperfections of the glass manufacturing process introduce local curvatures. At training time, unconstrained surface curvatures could be generated to account for this observation. However, it would be difficult to sample realistic surfaces. Moreover, the computation of the AOI from the surface curvature may be non-trivial. As a regularizer, a parabola is used instead. When the patches are synthesized, four parameters are sampled: the camera position C, a point on the surface $P_S$, a segment length, f, and the convexity as ±1 (see the curved surface generator in FIG. 2C). Since the segment is always mapped to the same output size, this parametrization allows to generate a number of different, realistic curvatures. Additionally, because a parabola is used, the AOI can be quickly computed in closed form, from the sample parameters.

From the output of the pipeline described so far, the simulated AOI, and a random polarization angle $\phi_0$, the polarization engine generates three observations with polarization angles separated by $\pi/4$. In practice, the polarizer angles $\phi_i$ may be inaccurate for real data due to the manual adjustments of the polarizer rotation. This can be accounted for by adding noise within ±4° to each polarizer angle $\phi_i$. Additionally, the following can be set: $\beta \sim U[1, 2, 8]$. The input for our deep learning network may be $\square^{B \times 128 \times 128 \times 9}$ when trained on 128×128 patches, where B=32 is the batch size. The model may be trained from scratch with a learning rate $5 \cdot 10^{-3}$ using ADAM. The colors of the network predictions might be slightly desaturated. A parameter-free color-histogram matching against one of the observations may be used to obtain the final results.

Parallel Processing Architecture

Figure 3:
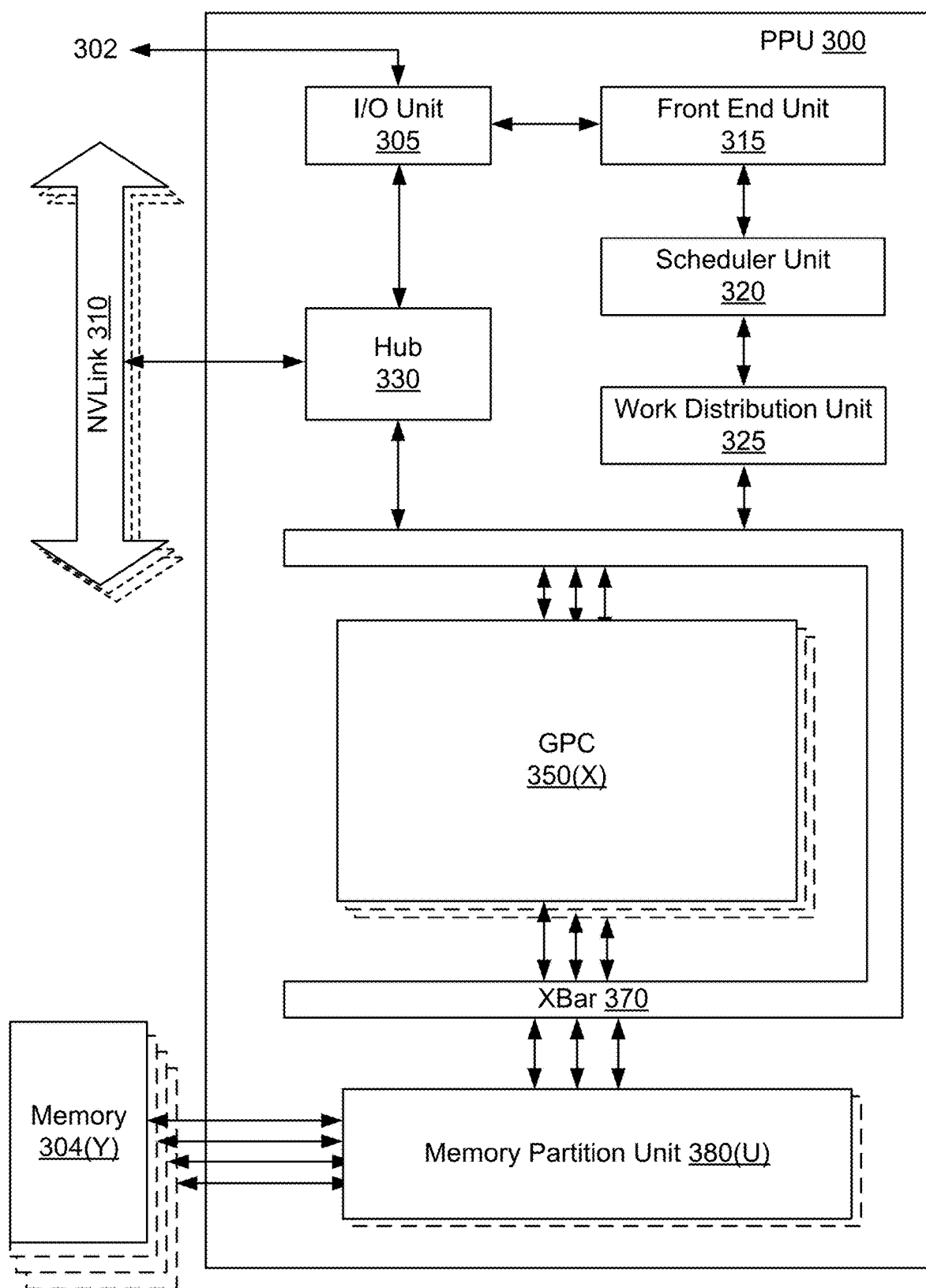
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
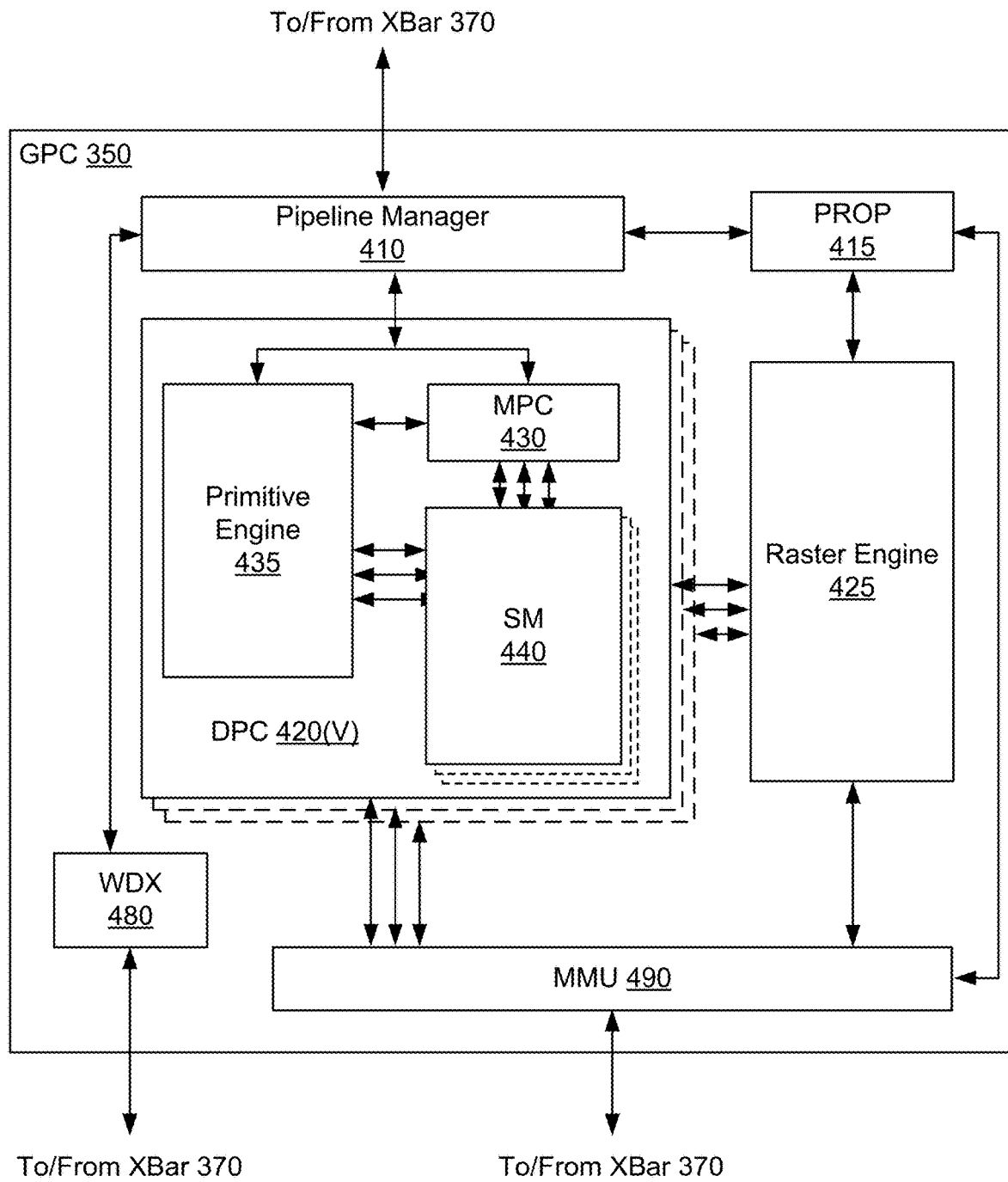
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
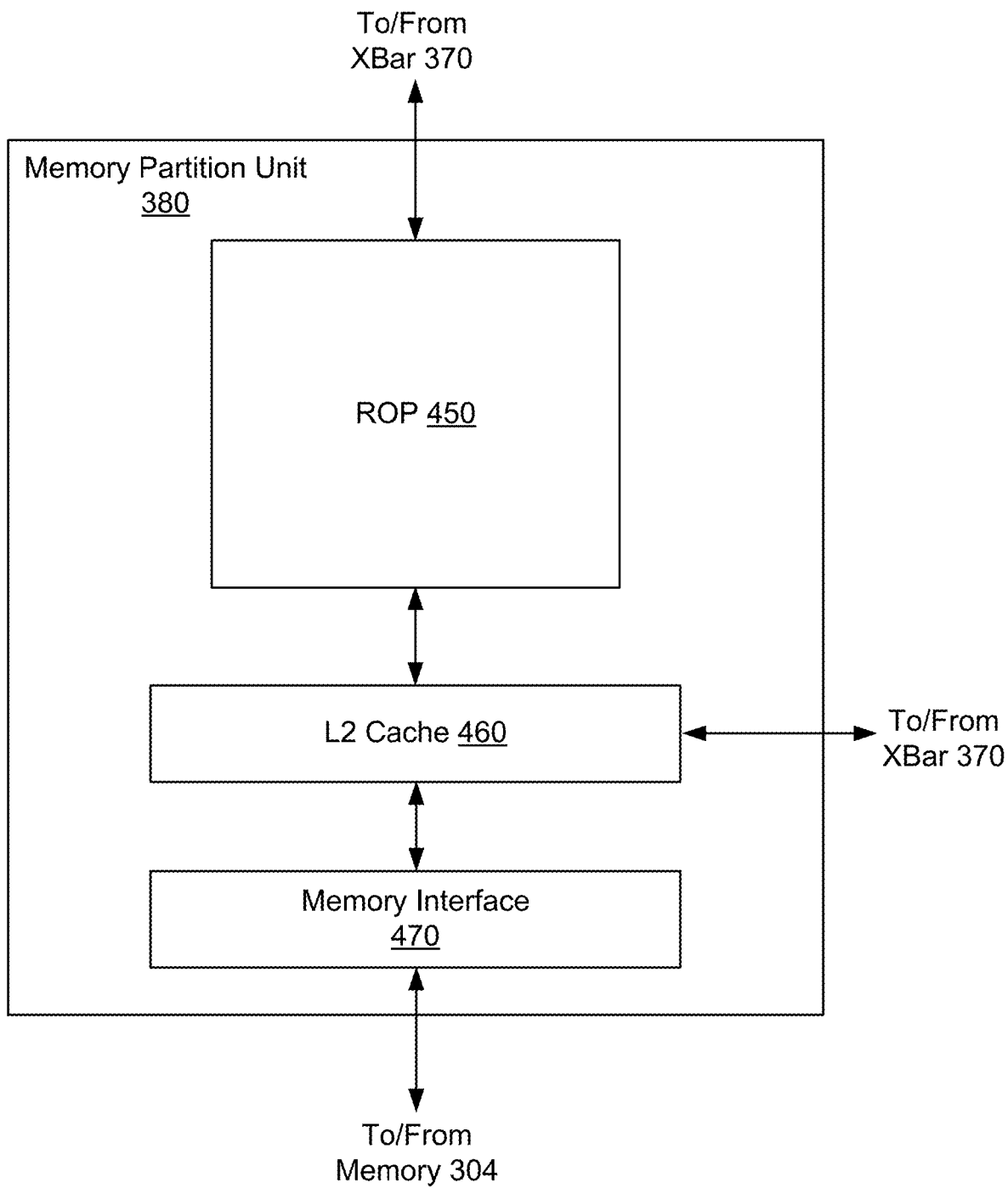
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
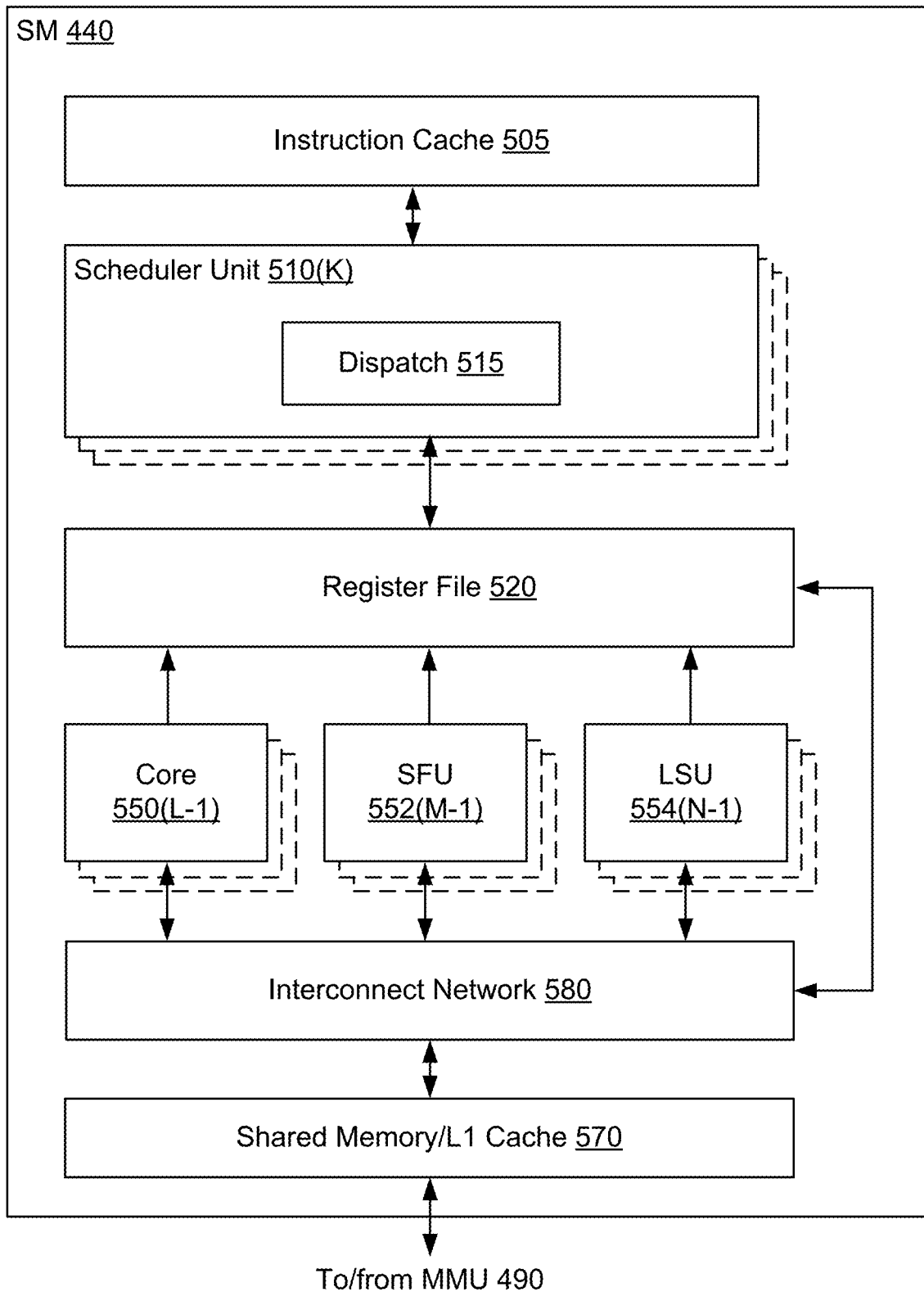
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
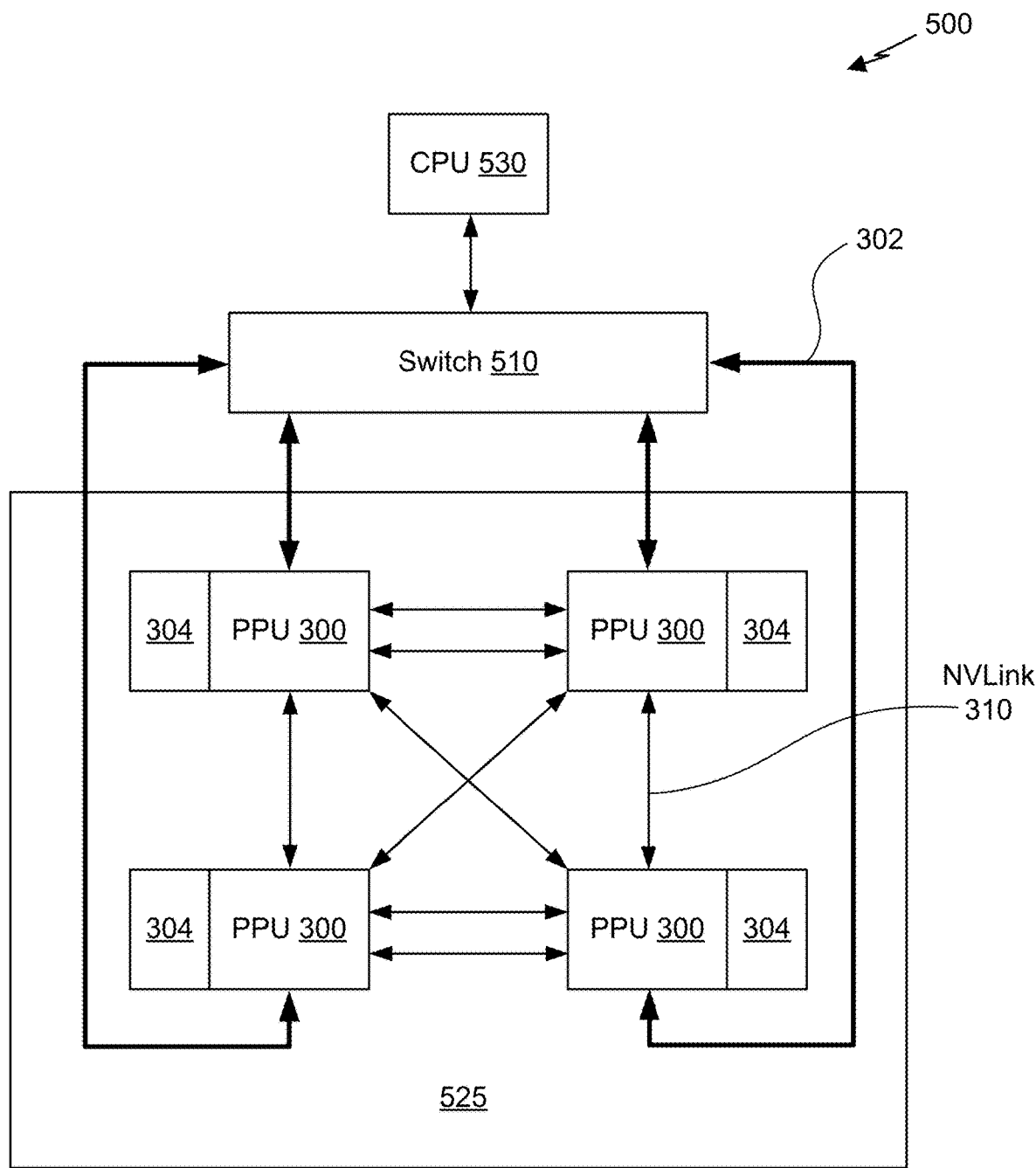
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/ second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
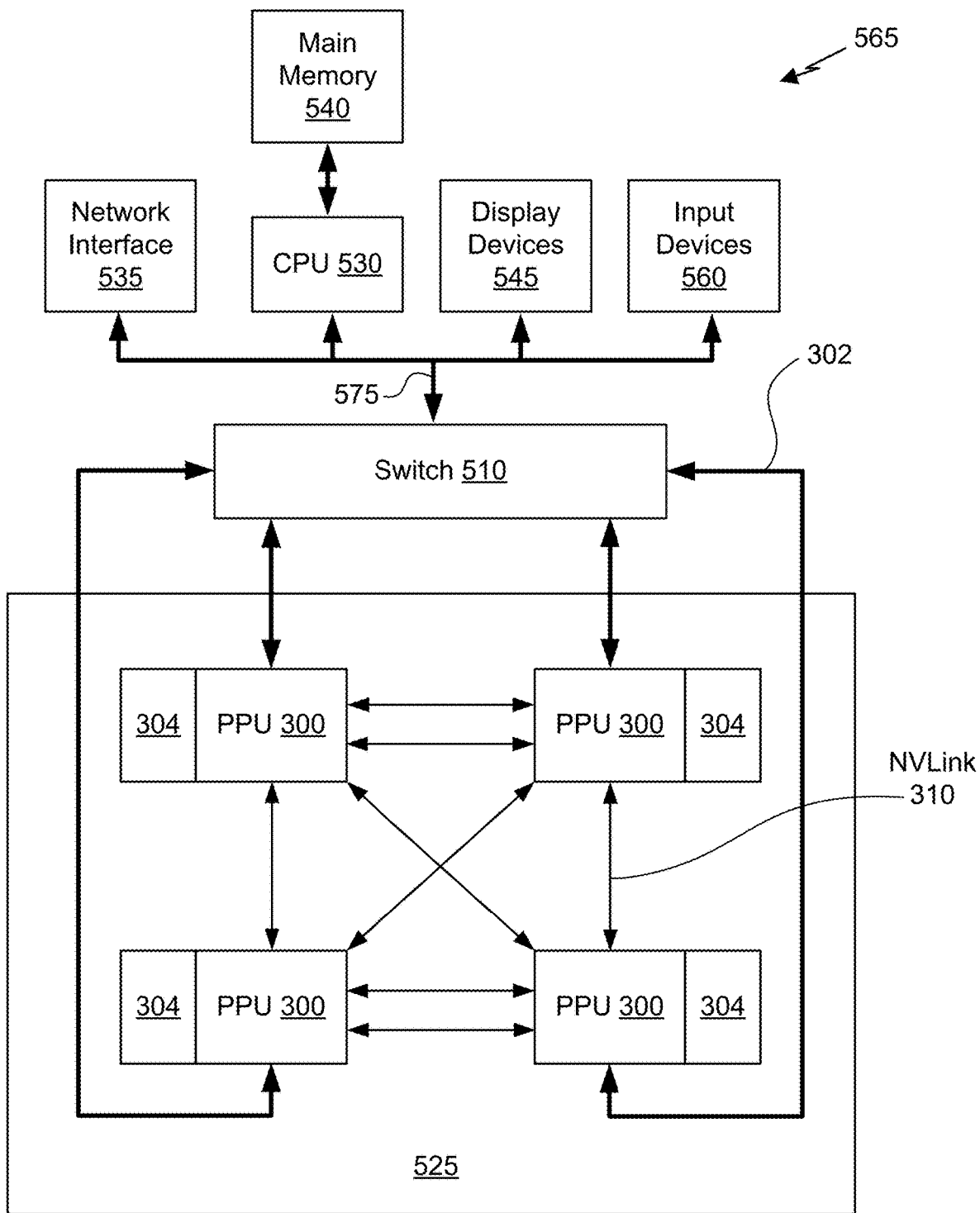
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
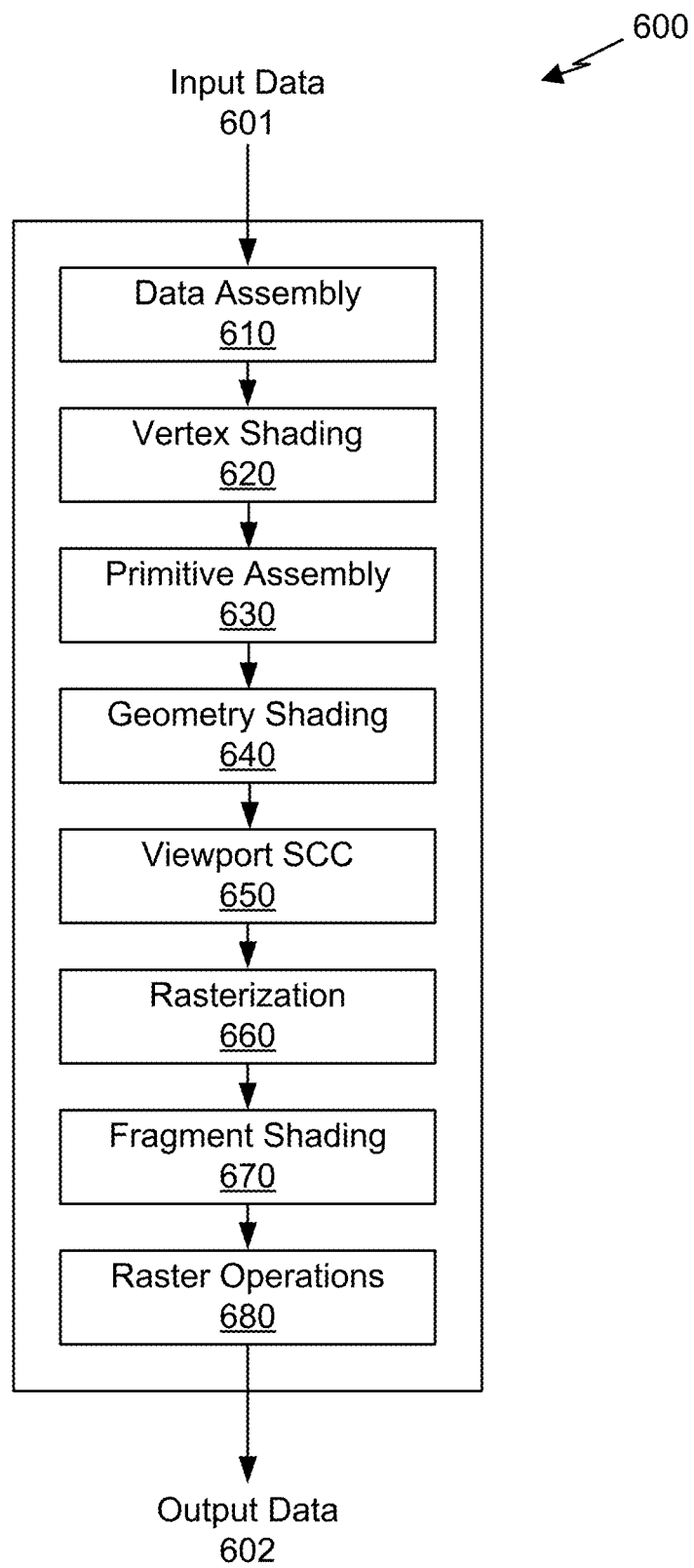
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A method, comprising:
   synthesizing training data for a deep learning network by applying a plurality of manipulations to a training reflection image and a training transmission image for a semi-reflective surface representation, the plurality of manipulations simulating behaviors observed in real-world data;
   training the deep learning network to learn a residual representation of a reflection and transmission relative to input images, using the training data;
   receiving, as input to the deep learning network, polarization images of a real-world scene having a semi-reflective surface;
   outputting, by the deep learning network, the residual representation of the reflection and transmission for the semi-reflective surface of the real-world scene.

2. The method of claim 1, wherein the training reflection image and the training transmission image are included in a data point randomly selected from a training image set.

3. The method of claim 1, wherein the plurality of manipulations are applied to the training reflection image and training transmission image through a data generation pipeline that takes the training reflection image and training transmission image as input and that outputs the training data for the deep learning network.

4. The method of claim 1, wherein the plurality of manipulations includes:
   manipulating the dynamic range (DR) of the training reflection image and the training transmission image.

5. The method of claim 4, wherein manipulating the DR of the training reflection image and the training transmission image includes brightening the training reflection image or the training transmission image.

6. The method of claim 4, wherein manipulating the DR of the training reflection image and the training transmission image includes providing edge-aware reflection.

7. The method of claim 6, wherein the edge-aware reflection is provided by setting to zero regions of the training reflection image having an intensity below a defined threshold.

8. The method of claim 1, wherein the plurality of manipulations includes:
   manipulating the training reflection image and the training transmission image to simulate artifacts caused by movement.

9. The method of claim 8, wherein the artifacts include non-rigid deformations.

10. The method of claim 8, wherein the artifacts are simulated by defining a grid over a patch of the training reflection image, perturbing the grid's anchors by a selected x,y amount, and interpolating a position of remaining pixels in the patch.

11. The method of claim 10, wherein polarization images are created for the patch, each of the polarization images being a separate image created for a different polarization angle.

12. The method of claim 1, wherein the plurality of manipulations includes:
   manipulating the training reflection image and the training transmission image to simulate local curvatures of the semi-reflective surface representation.

13. The method of claim 12, wherein the local curvatures are simulated using a parabola by sampling four parameters: a camera position, a point on the semi-reflective surface representation, a segment length, and a convexity as +/−1.

14. The method of claim 1, wherein the training data includes:
   a latent reflection image,
   a latent transmission image, and
   training polarization images.

15. The method of claim 1, wherein the polarization images captured for the scene include a plurality of images of the scene captured at different polarization angles.

16. The method of claim 1, wherein the deep learning network generates an estimated reflection image and an estimated transmission image from the polarization images.

17. The method of claim 16, wherein the deep learning network learns the residual representation of the reflection and transmission for the semi-reflective surface of the real-world scene, using the estimated reflection image and the estimated transmission image.

18. A non-transitory computer readable storing code executable by a processor to perform a method comprising:
   synthesizing training data for a deep learning network by applying a plurality of manipulations to a training reflection image and a training transmission image for a semi-reflective surface representation, the plurality of manipulations simulating behaviors observed in real-world data;
   training the deep learning network to learn a residual representation of a reflection and transmission relative to input images, using the training data;
   receiving, as input to the deep learning network, polarization images of a real-world scene having a semi-reflective surface;
   outputting, by the deep learning network, the residual representation of the reflection and transmission for the semi-reflective surface of the real-world scene.

19. A system, comprising:
   a memory; and
   at least one processor for:
   synthesizing training data for a deep learning network by applying a plurality of manipulations to a training reflection image and a training transmission image for a semi-reflective surface representation, the plurality of manipulations simulating behaviors observed in real-world data;
   training the deep learning network to learn a residual representation of a reflection and transmission relative to input images, using the training data;
   receiving, as input to the deep learning network, polarization images of a real-world scene having a semi-reflective surface;

outputting, by the deep learning network, the residual representation of the reflection and transmission for the semi-reflective surface of the real-world scene.

\* \* \* \* \*